US006484311B2

(12) United States Patent
Sobeski et al.

(10) Patent No.: US 6,484,311 B2
(45) Date of Patent: *Nov. 19, 2002

(54) COALESCING PROPERTIES, METHODS AND EVENTS

(75) Inventors: David A. Sobeski, Redmond; Daryl B. Olander, Kirkland, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,925

(22) Filed: Jul. 15, 1998

(65) Prior Publication Data

US 2002/0066084 A1 May 30, 2002

(51) Int. Cl.[7] .................................................. G06F 9/45
(52) U.S. Cl. ........................ 717/139; 717/140; 717/148
(58) Field of Search .......................... 717/120, 136–143, 717/148, 162, 163; 707/4, 103 R, 103 Y, 103 Z, 104.1; 709/201, 328, 331, 332

(56) References Cited

U.S. PATENT DOCUMENTS

| | | | | |
|---|---|---|---|---|
| 5,075,847 A | * | 12/1991 | Fromme | 717/5 |
| 5,768,593 A | * | 6/1998 | Walters et al. | 717/5 |
| 5,931,900 A | * | 8/1999 | Notani et al. | 709/201 |
| 5,963,955 A | * | 10/1999 | Melahn et al. | 707/103 |
| 5,995,945 A | * | 11/1999 | Notani et al. | 705/28 |

OTHER PUBLICATIONS

"JavaBeans Migration Assistant for ActiveX: Migrating ActiveX Components to JavaBeans" [online]. IBM Posted Apr. 5, 1998[retrived on Nov. 29, 1999]. Retrieved from the Internet:<URL:www7.software.ibm>.*

"SUN Enriches JavaBeans Component Architecture" Press Release [online]. SUN Microsystems, Jul. 1997[retrieved on Dec. 3, 1999]. Retrieved from the Internet:<URL:www.sun.com/smi/Press/sunflash/>.*

"SUN Microsystems'JavaBeans Development Kit in Full–Scale Deployment" Press Release [online]. SUN Misrosystems, Mar. 1997[retrieved on Dec. 3, 1999]. Retrieved from the Internet: <URL: www.sun.com/smi/Press/sunflash/1997–03/sunflash.970311.11733.html>.*

"SUN Microsystems, Inc. Announces JavaBeans Development Kit" Press Release [online]. SUN Microsystems, Dec. 1996[retrieved on Dec. 3, 1999]. Retrieved from the Internet: <URL:www.sun.com/smi/Press/sunflash/1996–12/sunflash.961211.15499.html>.*

"The JavaBeans Bridge for ActiveX" Datasheet [online]. SUN MIcrosystems, Feb 1998[retrieved on Nov. 29, 1999]. Retrieved from the Internet:<URL:www.su.com/beans/software/bridge/>.*

Trevor Harmon, "Java SDK 2.0: A Two–Way Bridge between ActiveX and Java," Article [online]. Microsoft Corporation, 1998 [retrieved on Jun. 20, 2000].*
Retrieved from <URL: wysiwyg://284/http://msdn.microsoft.com/library/periodic/period98/th _sdk2.htm>.*

Jonathan Locke, "Talking The Wraps of Microsoft Visual J++" Article [online]. Microsoft Corporation 1996 [retreived on Jun. 20, 2000].*

(List continued on next page.)

*Primary Examiner*—Tuan Q. Dam
(74) *Attorney, Agent, or Firm*—Klarquist Sparkman, LLP

(57) ABSTRACT

Coalescing properties, methods and events is disclosed. One embodiment of the invention is a computerized system having an ActiveX control, a Java object, and an engine. The engine, which may be a computer program running on a computer, converts types of the ActiveX control to corresponding types of the Java object. In different embodiments of the invention, the engine may be compile-time or run-time.

29 Claims, 6 Drawing Sheets

OTHER PUBLICATIONS

Retrieved from <URL: wysiwyg://160/http://msdn.microsoft.com/library/periodic/period96/visualj.htm>.*

"Java Spot News". Press Release [online]. Sun Microsystems, Inc., 1997 [retieved on Jun. 20, 2000].*

Retrieved from <URL: http://java.sun.com/pr/1997/april/spotnews/sn970428.html>.*

"Java Plug–In Scripting: Using JavaBeans# with Microsoft ActiveX Components" Document [online]. Sun Microsystems, Inc. [retrieved on Jun. 23, 2000].*

Retrieved from <URL: http://java.sun.com/products/plugin/1.2/docs/script.html>.*

* cited by examiner

RUN-TIME
JAVA TO OLE

COALESCING PROPERTIES, METHODS AND EVENTS

FIELD

This invention relates generally to properties, methods and events available in software component architectures, and more particularly to coalescing such properties, methods and events between different such architectures.

BACKGROUND

Software component architectures have become an increasingly popular manner by which developers develop computer programs. Software components may be reusable, such that developers do not have to rewrite code to provide for functionality that is already provided by a given software component. Common software component architectures include those available within the Java programming language, such as JavaBeans and other Java objects, as well as Microsoft's Component Object Model (COM).

A software component typically has outside interfaces that allow interconnection with other software components, and inside code that effectuates or implements these interfaces. The inside code is not usually accessible to other components. The outside interfaces may come in three different types: properties, methods and events. The occurrence of an event, which may be generally defined as a condition, causes the execution of a method. A method, which has one or more properties that may be generally defined as parameters of the method, may be generally defined as a sequence of code that provides for a desired functionality.

A disadvantage to software developers is, however, that software components written in accordance with one architecture, such as COM, may not usually be used in accordance with another, such as Java. This means that even if the developer finds a component that he or she desires to use, if the component is operative within a different architecture, the component is generally unusable. For these and other reasons, there is a need for the present invention.

SUMMARY

The above-mentioned shortcomings, disadvantages and problems are addressed by the present invention, which will be understood by reading and studying the following specification. One aspect of the invention is a computerized system having an ActiveX control, a Java object, and an engine. The engine, which may be a computer program running on a computer, converts types of the ActiveX control to corresponding types of the Java object. In different embodiments of the invention, the engine may be compile-time or run-time.

At least some embodiments of the invention provides for advantages over the prior art. For example, ActiveX controls, which are a type of object within the Component Object Model (COM), may be utilized within a Java environment via at least some embodiments of the invention. Thus, the Java programmer is not limited to utilizing only Java objects such as JavaBeans in developing programs, but may also resort to COM objects such as ActiveX controls. Such embodiments of the invention provide for such coalescing of types from ActiveX controls to Java at both compile-time and run-time.

The present invention includes computerized systems, computers, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a compile-time embodiment of the invention is presented. In the third section, a run-time embodiment of the invention of the invention is given. Finally, in the fourth section, a conclusion of the detailed description is provided.

Hardware and Operating Environment

Figure 1:
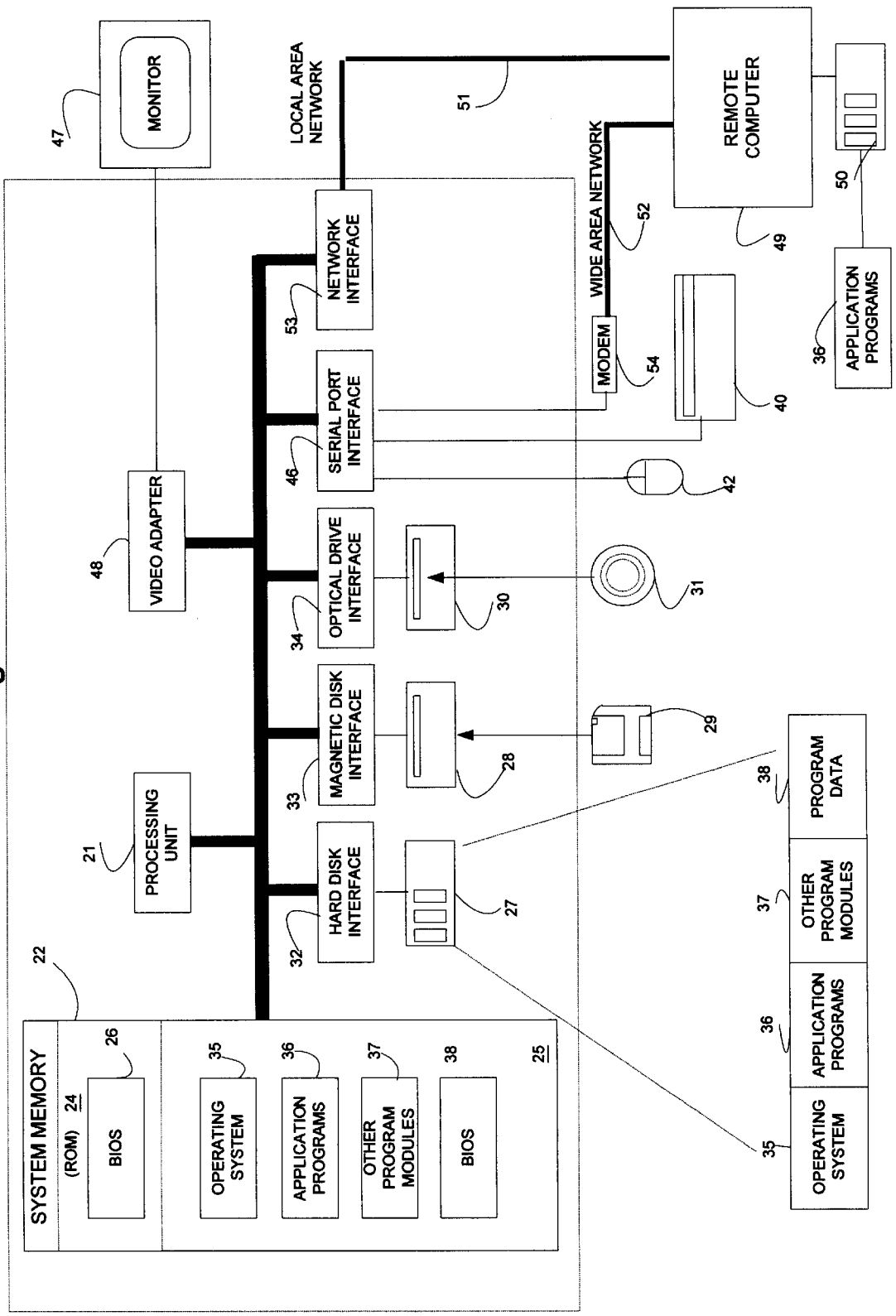
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Such pointing devices may include a mouse, a trackball, a wheel, a touch pad, etc.; the invention is not so limited. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory.

A COMPILE-TIME EMBODIMENT OF THE INVENTION

Figure 2:
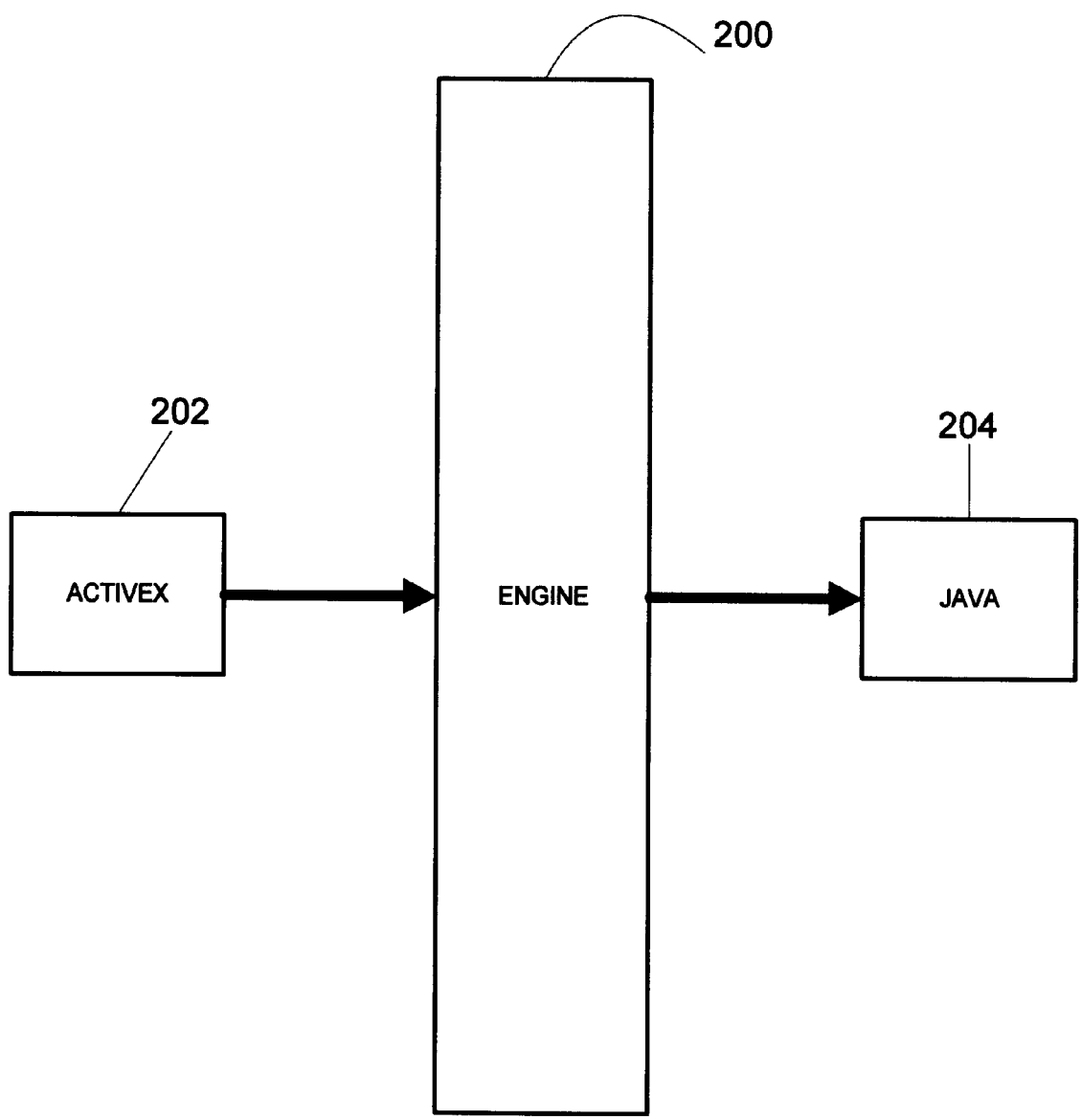
FIG. 2 shows a block diagram of a system according to a compile-time embodiment of the invention.

A description of a compile-time embodiment of the invention is described by reference to FIG. 2 and FIG. 3. Referring first to FIG. 2, a computerized system according to a compile-time embodiment of the invention is shown. The computerized system includes an engine 200, an ActiveX control 202, and a Java object 204. The engine 200 is desirably a computer program running on a computer (for example, a program executed by a processor of the computer from a computer-readable medium such as a memory of the computer); the invention is not so limited, however. The engine 200 converts at compile-time types of the ActiveX control 202 to corresponding types of the Java object 204.

The ActiveX control 202 is a Component Object Model (COM) object. The control 202 has a number of types, stored in a type library as known within the art. The types include events, methods and properties. The ActiveX control describes its type information in what is known in the art as type libraries. The Java object 204 is an object for use within a Java programming language environment. Representative such objects include JavaBeans, although the invention is not so limited. The Java object 204 also has a number of types, stored as a series of design patterns, as also known within the art.

Thus, the (compile-time) embodiment of the invention shown in FIG. 2 achieves type coalescing by converting the events, methods and properties of the ActiveX control 202 to corresponding events, methods and properties of the Java object 204. In this way, at least some embodiments of the invention have advantages over the prior art. For example, by utilizing the engine 200 of the compile-time embodiment of the invention shown in FIG. 2, a developer is able to use ActiveX controls within a Java environment; that is, the properties, methods and events of an ActiveX object are exposed to the Java developer, such that they are seamlessly accessible from Java objects. The embodiment of FIG. 2 is compile-time in the sense that the engine 200 converts ActiveX control types to corresponding Java object types at the time of compiling Java objects, as opposed to at run-time.

Figure 3:
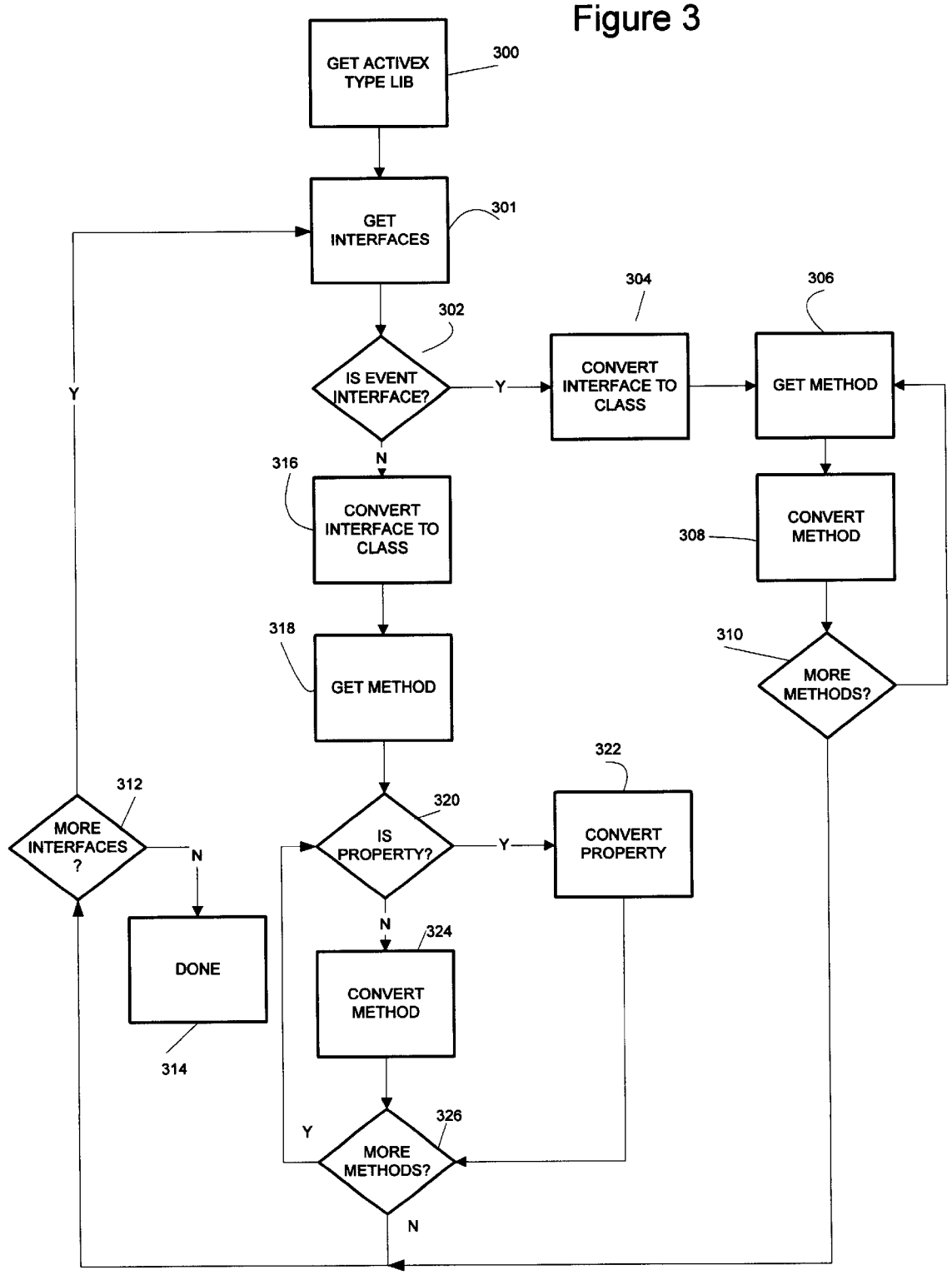
FIG. 3 shows a flowchart of a method according to a compile-time embodiment of the invention.

Referring next to FIG. 3, a flowchart of a method according to a compile-time embodiment of the invention is shown. The embodiment of the invention of FIG. 3 may be utilized in conjunction with or in lieu of the embodiment of FIG. 2; that is, the embodiment of FIG. 3 does not require utilization of FIG. 2 as well. The method to be performed may be one or more computer programs (e.g., an engine program) made up of computer-executable instructions. Describing the method by reference to a flowchart enables one skilled in the art to develop programs including instructions to carry out the methods on a suitable computer (the processor of the computer executing the instructions from computer-readable media such as memory). The one or more computer programs may be stored on a computer-readable medium such as a floppy disk or a compact-disc read-only-memory (CD-ROM). An engine program in one embodiment thus converts types of an ActiveX control to corresponding types of a Java object at compile-time.

In 300, a type library of an ActiveX control is retrieved. The type library is then proceeded through to convert types of the ActiveX control to corresponding types of a Java object. The conversion is performed in one embodiment by a type-coalescing engine, which desirably has a look-up table to map ActiveX control types (that is, OLE Automation types, as known within the art) to Java types. Furthermore, desirably, only those types from the type library that have matches in the look-up table are converted. Desirably, conversion is performed at compile-time.

In 301, an interface is retrieved from the type library of the ActiveX control retrieved in 300. In 302, it is determined whether the interface is an event interface. Events are described in the type library as a dispinterface or an outgoing interface, as known within the art. If the interface is an event interface, control proceeds to 304. In 304, the event interface of the ActiveX type library is converted to a Java 10 class. Next, in 306, a method for the event interface retrieved in 301 is retrieved. In 308, the method is converted to Java. If in 310 there are more methods, control proceeds back to 306; otherwise, control proceeds to 312, where it is checked whether there are more interfaces. If not, the method ends at 314; otherwise, control proceeds back to 301.

If, however, at 302 the interface is determined not to be an event interface, control proceeds to 316. In 316, the interface of the ActiveX type library is converted to a Java class. Unlike with event interfaces, other interfaces may have properties. Thus, in 318, a method for the interface retrieved in 316 is retrieved. The method may be marked in the type library as a property, as known within the art. A property in one embodiment may be defined as having a setFoo and/or a getFoo call, as known within the art. If this is the case, then from 320 to 322, the property name is manipulated to match an appropriate Java design pattern (i.e., the property is converted into Java). Furthermore, a look-up table of ID's is maintained, desirably, where the ID is used by the Java Virtual Machine to make a call into the ActiveX control (i.e., an OLE object) when the property needs to be invoked. If, however, the method does not have a property (or, all the properties have been processed), then from 320 to 324, the method is converted into Java. In either case, in 326, if there are more methods, then control proceeds back to 318. Otherwise, control proceeds to 312. If there are more events in the type library retrieved in 300, then control proceeds back to 301. Otherwise, the method of FIG. 3 ends at 314. A description of a compile-time embodiment of the invention has thus been provided in this section of the detailed description.

A RUN-TIME EMBODIMENT OF THE INVENTION

Figure 4:
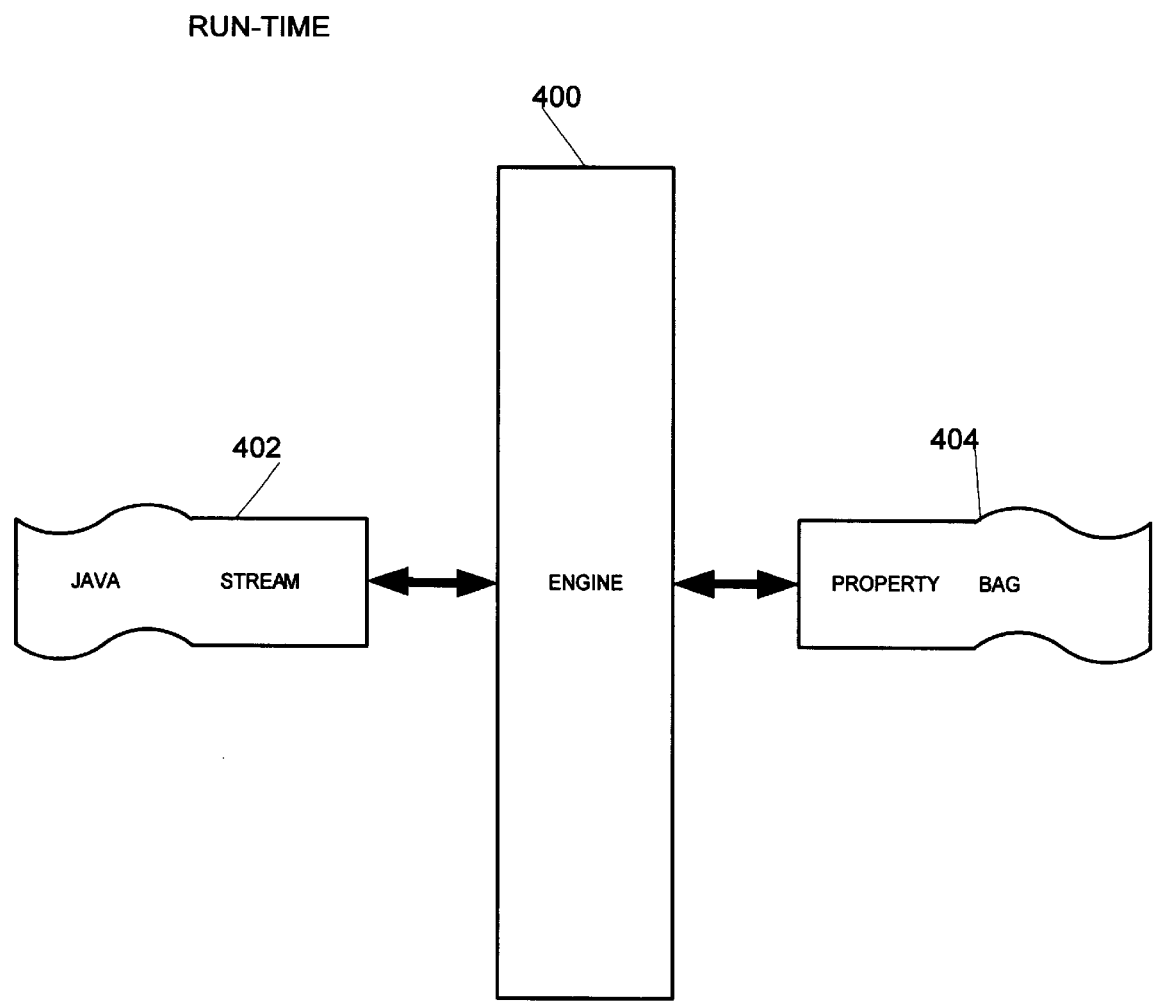
FIG. 4 shows a block diagram of a system according to a run-time embodiment of the invention.

In the previous section, a description of a compile-time embodiment of the invention was described. In this section, a description of a run-time embodiment of the invention is provided. A description of a run-time embodiment of the invention is described by reference to FIGS. 4, 5 and 6. Referring first to FIG. 4, a computerized system according to a embodiment of the invention is shown. The computerized system includes an engine 400, a property bag 404 of properties associated with an ActiveX control, and a Java stream 402 of properties associated with a Java object. The engine 400 is desirably a computer program running on a computer (for example, a program executed by a processor of the computer from a computer-readable medium such as a memory of the computer); the invention is not so limited, however. The engine 400 converts at run-time types (specifically, properties) of an ActiveX control associated with the property bag 404 to corresponding types (specifically, properties) of a Java object associated with the Java stream 402, and vice-versa.

The ActiveX control associated with the property bag 404 is a Component Object Model (COM) object. ActiveX controls, as known within the art, can have their state loaded from or saved to a property bag. A property bag is a stream of bits that can be located on a medium, such as a memory or a disk. The Java object associated with the Java stream 402 is an object for use within a Java programming language environment. Representative such objects include JavaBeans, although the invention is not so limited. A Java stream is also a stream of bits that can be located on a medium, such as a memory or a disk. Both a property bag in the case of COM and a Java stream in the case of Java provide for the persistence of properties of their associated objects.

Thus, the (run-time) embodiment of the invention shown in FIG. 4 achieves type coalescing by converting the properties of the property bag 404 to corresponding properties of the Java stream 402, and vice-versa. In this way, at least some embodiments of the invention have advantages over the prior art. For example, by utilizing the engine 400 of the run-time embodiment of the invention shown in FIG. 4, a developer is able to utilizing ActiveX controls within a Java environment at run-time; that is, the properties of an ActiveX object are exposed to the Java developer and remain persistent (i.e., persistence is achieved), such that they are seamlessly accessible from Java objects, and vice-versa. The embodiment of FIG. 4 is run-time in the sense that the engine 400 converts ActiveX control properties to corresponding Java object properties, and vice-versa, during execution of a computer program, at run-time, as opposed to at compile-time.

Figure 5:
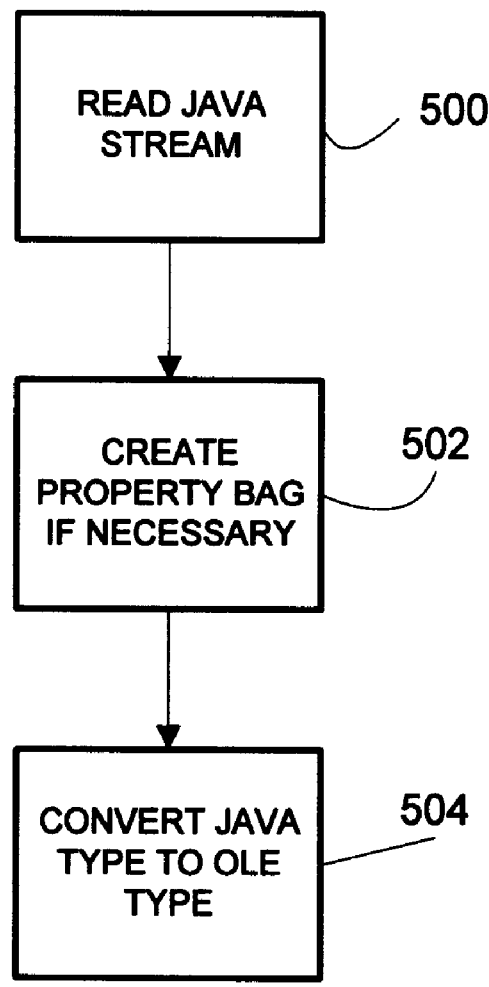
FIG. 5 shows a flowchart of a method according to a run-time embodiment of the invention; and, FIG. 6 shows a flowchart of another method according to a run-time embodiment of the invention.

Referring next to FIG. 5, a flowchart of a method according to a run-time embodiment of the invention is shown. The embodiment of the invention of FIG. 5 may be utilized in conjunction with or in lieu of the embodiment of FIG. 4; that is, the embodiment of FIG. 5 does not require utilization of FIG. 4 as well. The method to be performed may be one or more computer programs made up of computer-executable instructions (e.g., an engine program). Describing the method by reference to a flowchart enables one skilled in the art to develop programs including instructions to carry out the methods on a suitable computer (the processor of the computer executing the instructions from computer-readable media such as memory). The one or more computer programs may be stored on a computer-readable medium such as a floppy disk or a compact-disc read-only-memory (CD-ROM). In one embodiment, an engine program converts types (specifically, properties) of an ActiveX control associated with a property bag to corresponding types (specifically, properties) of a Java object associated with a Java stream, and vice-versa, at run-time. The method of FIG. 5 specifically recites the conversion of Java properties to OLE properties, as the latter term is known within the art.

In 500, a Java stream is read from a medium such as a hard disk drive or a memory. Desirably, the stream is read by an engine program. In 502, a property bag corresponding to the Java stream is dynamically created if necessary (that is, if one does not already exist), desirably as an in-memory property bag. In 504, the Java types associated with the Java stream are converted to corresponding ActiveX types (i.e., OLE types) associated with the property bag, desirably at run-time. A type-mapping function, in the form of a look-up table, is desirably used to dynamically convert at run-time a Java type to an OLE type. Thus, the engine desirably parses (i.e., "cracks") the Java types, and converts them to appropriate OLE types.

Figure 6:
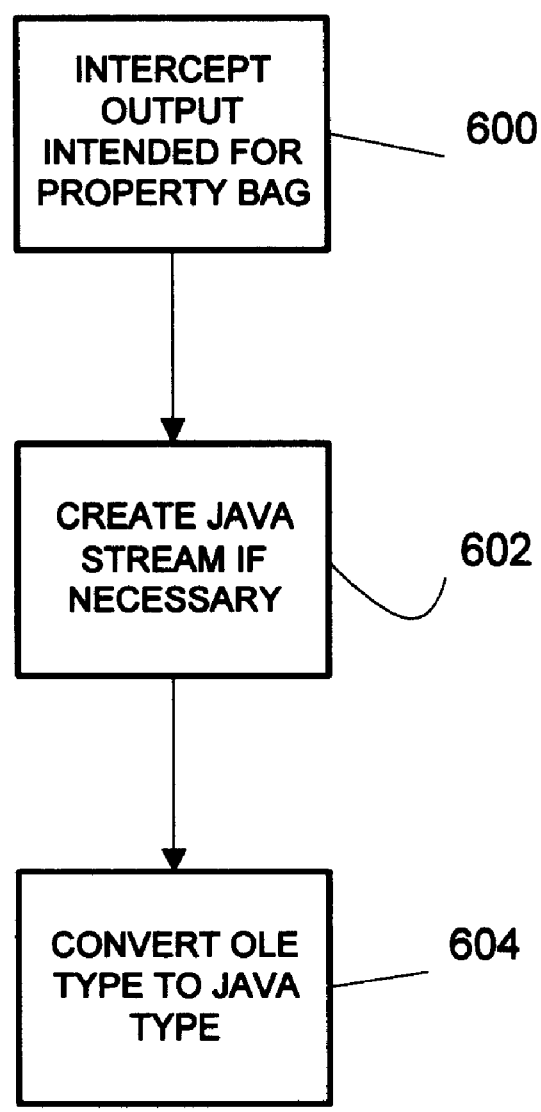

Referring finally to FIG. 6, a flowchart of another method according to a run-time embodiment of the invention is shown. The embodiment of the invention of FIG. 6 may be utilized in conjunction with or in lieu of the embodiment of FIG. 4 or 5; that is, the embodiment of FIG. 6 does not require utilization of FIG. 5 or 6 as well. The method to be performed may be one or more computer programs made up of computer-executable instructions (e.g., an engine program). Describing the method by reference to a flowchart enables one skilled in the art to develop programs including instructions to carry out the methods on a suitable computer (the processor of the computer executing the instructions from computer-readable media such as memory). The one or more computer programs may be stored on a computer-readable medium such as a floppy disk or a compact-disc read-only-memory (CD-ROM). In one embodiment, an engine program converts types (specifically, properties) of an ActiveX control associated with a property bag to corresponding types (specifically, properties) of a Java object associated with a Java stream, and vice-versa, at run-time. The method of FIG. 6 specifically recites the conversion of OLE properties to Java properties, as the latter term is known within the art.

In 600, a property bag is read, desirably by an engine. That is, an ActiveX control, when writing out to a property bag, has its output intercepted. In 602, a Java stream corresponding to the property bag is dynamically created if necessary (that is, if one does not already exist). In 504, the ActiveX types (specifically, properties) associated with the property bag are converted to corresponding Java types (specifically, properties) associated with the property bag, desirably at runtime. All OLE types (that is, ActiveX types) desirably need to be converted to corresponding Java types in order to persist in the Java stream. The types are dynamically converted desirably at run-time using a type-mapping function, such as a look-up table. Thus, the engine desirably parses (i.e., "cracks") the OLE types, and converts them to appropriate Java types. A description of a run-time embodiment of the invention has thus been provided.

CONCLUSION

Coalescing properties, methods and events has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer system comprising:
   an ActiveX control;
   a Java object; and
   an engine operative at Java object run-time, to determine a Java type corresponding to an ActiveX type.

2. The computer system of claim 1, wherein the ActiveX control has a bag storing the ActiveX type, and whereby the engine determines the Java type by reading the ActiveX type from the bag, and performs a table look-up to find the Java type.

3. The computer system of claim 2, wherein the type is a property.

4. The computer system of claim 2, wherein the type is a method.

5. The computer system of claim 2, wherein the type is an event.

6. A computer executable method, the method having the steps:
   providing an ActiveX control having a bag storing ActiveX types and a Java object having a Java stream;
   determining at the Java object run-time a Java type corresponding to an ActiveX type read from the bag; and
   writing the Java type to the Java stream.

7. The computer executable method of claim 6, wherein the step of determining comprises finding the corresponding Java type in a table.

8. The computer executable method of claim 7, wherein the type is a property.

9. The computer executable method of claim 7, wherein the type is a method.

10. The computer executable method of claim 7, wherein the type is an event.

11. A computer executable method for determining at a Java object run-time, a Java object type corresponding to an ActiveX type, the method having the steps:
    reading from a bag having the ActiveX type; and
    finding a corresponding Java type in a table.

12. The computer executable method of claim 11, wherein the type is an event.

13. The computer executable method of claim 11, wherein the type is an property.

14. The computer executable method of claim 11, wherein the type is a method.

15. A computer-readable medium having an engine program stored thereon for execution on a computer, the engine program determining a Java object type corresponding to an ActiveX type, the determination made at the Java object run-time.

16. The computer-readable medium of claim 15, wherein the type is an event.

17. The computer-readable medium of claim 15, wherein the type is a property.

18. The computer-readable medium of claim 15, wherein the type is a method.

19. A computer comprising:

a processor;

a computer-readable medium; and a computer program from the medium executed by the processor to determine a Java object type corresponding to an ActiveX type, the determination made at the Java object run-time.

20. The computer of claim 19, wherein determining a corresponding type comprises:

reading a property bag having the ActiveX type; and locating a corresponding Java type in memory.

21. The computer of claim 20, wherein the type is an event.

22. The computer of claim 20, wherein the type is a property.

23. The computer of claim 20, wherein the type is a method.

24. A computer executable method for determining a Java object type corresponding to a type stored in an ActiveX control bag, the method having the steps:

reading an ActiveX type from the bag; and performing a table look-up to find the Java object type corresponding to the ActiveX type, the performance made at the Java object run-time.

25. A computer system for determining an ActiveX control type corresponding to a Java object type at the Java object run-time, the computer system comprising:

a Java stream for storing a type associated with the Java object; and a conversion engine operative at the ActiveX control run-time;

whereby the conversion engine reads a type from the Java stream, and performs a table look-up to determine the corresponding ActiveX type.

26. A computer executable method for determining an ActiveX type corresponding to a Java type, the method having the steps:

providing a data structure storing ActiveX types corresponding to Java types;

providing a Java stream storing Java types;

reading a Java object type from the Java steam; and finding the corresponding ActiveX type in the data structure, the finding made at the Java object run-time.

27. The computer-executable method of claim 26, wherein the type is a property.

28. The computer-executable method of claim 26, wherein the type is a method.

29. The computer-executable method of claim 26, wherein the type is an event.

* * * * *

UNITED STATES PATENT AND TRADEMARK OFFICE
CERTIFICATE OF CORRECTION

PATENT NO.    : 6,484,311 B2  Page 1 of 1
DATED         : November 19, 2002
INVENTOR(S)   : David A. Sobeski and Daryl B. Olander It is certified that error appears in the above-identified patent and that said Letters Patent is hereby corrected as shown below:

Title page,
Item [56], References Cited, OTHER PUBLICATIONS, "JavaBeans Migration" reference, "retrived" should read -- retrieved --; and "The JavaBeans Bridge", reference, "www.su.com/beans/soft" should read -- www.sun.com/beans/soft --.

Column 2,
Lines 43-44, "of the invention of the invention" should read -- of the invention --.

Column 5,
Line 51, "Java 10 class" should read -- Java class --.

Column 6,
Lines 21-22, "run-time embodiment of the invention is described" should read -- run-time is described --.
Lines 23-24, "according to a embodiment" should read -- according to a run-time embodiment --.
Line 32, "engine 400 converts" should read -- engine converts --.
Line 58, "utilizing" should read -- utilize --.

Column 10,
Line 23, "steam" should read -- stream --.

Signed and Sealed this

Eighteenth Day of November, 2003

JAMES E. ROGAN
*Director of the United States Patent and Trademark Office*